(12) United States Patent
Rijpekema (10) Patent No.: US 7,839,774 B2
(45) Date of Patent: Nov. 23, 2010

(54) DATA PROCESSING CIRCUIT WHEREIN DATA PROCESSING UNITS COMMUNICATE VIA A NETWORK

(75) Inventor: Edwin Rijpekema, Nieuwerkerk a/d Ijssel (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 444 days.

(21) Appl. No.: 10/598,299

(22) PCT Filed: Feb. 21, 2005

(86) PCT No.: PCT/IB2005/050626

§ 371 (c)(1),
(2), (4) Date: Jul. 10, 2008

(87) PCT Pub. No.: WO2005/088464

PCT Pub. Date: Sep. 22, 2005

(65) Prior Publication Data

US 2008/0259949 A1    Oct. 23, 2008

(30) Foreign Application Priority Data

Mar. 3, 2004   (EP) ................... 04100849

(51) Int. Cl.
- *G01R 31/08* (2006.01)
- *H04L 12/43* (2006.01)
- *G06F 3/00* (2006.01)

(52) U.S. Cl. ............... 370/230; 370/461; 719/313
(58) Field of Classification Search ........... 370/229, 370/230, 431, 436, 442–444, 458, 461, 216, 370/464, 468, 465; 375/316, 346; 719/313
See application file for complete search history.

(56) References Cited

U.S. PATENT DOCUMENTS

| | | | |
|---|---|---|---|
| 7,206,280 B1 * | 4/2007 | Khan et al. | 370/216 |
| 7,496,112 B1 * | 2/2009 | Danielson et al. | 370/468 |
| 7,640,446 B1 * | 12/2009 | Donovan | 713/322 |
| 2002/0126649 A1 | 9/2002 | Sakurai et al. | |
| 2002/0191642 A1 * | 12/2002 | Calvignac et al. | 370/474 |
| 2004/0052269 A1 * | 3/2004 | Hooper et al. | 370/442 |
| 2006/0041888 A1 * | 2/2006 | Radulescu et al. | 719/313 |
| 2006/0041889 A1 * | 2/2006 | Radulescu et al. | 719/313 |
| 2006/0087969 A1 * | 4/2006 | Santiago et al. | 370/229 |
| 2006/0095920 A1 * | 5/2006 | Goossens | 719/313 |
| 2008/0285691 A1 * | 11/2008 | Onggosanusi et al. | 375/346 |

\* cited by examiner

*Primary Examiner*—Ricky Ngo
*Assistant Examiner*—Paul Masur (57) ABSTRACT

A data processing circuit on an integrated circuit and an associated method of processing data in the data processing circuit is provided, the data processing circuit comprising a network operable in successive time-slots; a plurality of data processing units interconnected by the network, and arranged to send streams of messages concurrently through the network, each stream comprising messages that occupy shareable resources in the network in a periodically repeating selection of successive time-slots, a period of repetition (P) being the same for all the streams; node circuits in the network arranged to forward the messages along multi-node paths through the network, each particular stream being assigned a respective stream specific path along which the node circuits forward all messages of the particular stream, the node circuits being arranged to decide whether to forward or discard each message dependent on a measure of seniority of the message in its particular stream.

12 Claims, 3 Drawing Sheets

DATA PROCESSING CIRCUIT WHEREIN DATA PROCESSING UNITS COMMUNICATE VIA A NETWORK

The invention relates to a data processing circuit wherein data processing units communicate via a network, and in particular to an integrated circuit containing such a data processing circuit.

A signal processing circuit processes streams of real time, or near real time data such as audio or video data. In a distributed signal processing circuit streams of such data are exchanged between different data processing circuits such as programmable processor circuits, dedicated processing circuits, peripheral IO circuits etc that process the streams.

The real time nature of the streams requires that a guaranteed communication bandwidth be available for the streams, along which a predetermined quantity of data can be transmitted per time unit. The simplest way to provide a communication structure for such a purpose is the implementation of dedicated connection conductors for each stream. However, in most cases it is desirable to provide a communication structure that can be shared by different streams. This reduces circuit area for connection conductors, particularly if streams exist for a limited time-span or do not occupy all the available communication bandwidth.

A communication bus structure suffices to provide for communication in simple circuits with a few data processing units. In a bus structure, communicating data processing units are coupled to a shared set of communication conductors, and data from different streams is passed over these communication conductors in alternate time-slots. However, when growing numbers of communicating data processing units have to be interconnected such a simple communication structure no longer suffices.

To provide a larger and more flexible communication capacity, communication networks are used increasingly to interconnect data processing units inside integrated circuits. In a network there is no longer a single shared set of communication conductors that connect data processing units directly. Instead a plurality of such sets of shareable communication conductors is provided, interconnected by so-called node circuits that forward data from one set of communication conductors to another in order to create a communication path between different data processing units. A network typically makes it possible to establish a connection between a pair of data processing units along a selectable one from several alternative paths. If part of one path is occupied, another path may be selected. Thus, streams can be communicated between many arbitrarily selectable pairs of data processing units in parallel.

The real time nature of streams requires that a guaranteed amount of bandwidth, typically a predetermined fraction of available communication time-slots, be persistently available for each active stream. Interruptions of stream communication due to contention for resources such as communication conductors should be prevented, because interruptions lead to malfunctioning, such as interruptions in video display, or hick-up in audio output etc. To a certain extent, the contention problem can be mitigated by temporary buffering of data in the nodes, but the amount of buffering should be minimized, because the inclusion of buffer memory increases the integrated circuit area used by the nodes.

Guaranteeing the persistent availability of real time bandwidth for a stream conventionally requires some form of centralized planning, or at least programming of the nodes in the network to reserve resources for each stream, e.g. to indicate that access to a communication conductor to a next node is reserved for a particular stream during predetermined time-slots. When a data processing unit starts up a stream, it is necessary to search for unreserved time-slots at the node circuits, possibly in contention with other streams that are started up.

The need to store information in nodes to indicate that bandwidth is reserved for a stream complicates node design, which may slow down the nodes and take up valuable circuit area. The process of setting up this type of reservation data has the same disadvantages.

Among others, it is an object of the invention to provide for a circuit of data processing units with an interconnecting network, in which the network provides guaranteed access to successive messages of a stream of data, once the stream has been established, without requiring storage of information about the stream in node circuits of the network.

Among others, it is a further object of the invention to minimize the number of messages that need to be transmitted before the stream is sufficiently established to receive guaranteed access.

Among others, it is a further object of the invention to establish a return stream from a receiving data processing unit, in response to reception of a message from the stream, providing guaranteed access to the network for messages of the return stream, while requiring a minimum of messages to establish the return stream once the receiving data processing unit starts transmitting messages of the return stream.

Among others it is a further object to support the use of data processing units that are programmed to execute a combined task in a distributed way, communicating data streams involved in the tasks over an interconnecting network and in which the programs are independent of the length of paths through the network.

The invention provides for a circuit according to claim 1. In this circuit data processing units are interconnected through a time-slot multiplexing network that contains node circuits that forward messages through the network. The data processing units select starting time slots of streams of messages that occupy resources in the network in a periodically repeating pattern of time-slots, each stream having the same period (called the network period), successive messages of a stream travelling along the same stream specific path through the network.

The node circuits arbitrate whether messages get access to sharable network resources (such as communication lines between node circuits) on the basis of a seniority of the messages in their particular streams (i.e. the number of messages that has preceded the message since the start of the particular stream). A node circuit forwards a message from a particular stream only if messages with higher seniority from previously started streams leave sufficient resources. Otherwise the message is not forwarded. The seniority may be indicated for example in a field in the messages, which is read by the node circuits to determine seniority. In this way, once an initial message has been forwarded from a node circuit, it is ensured that all subsequent messages will be forwarded from that node circuit, since newly arising periodic streams that contend for resources an integer number of network periods later will always be less senior.

In embodiments, a confirmation is sent back that will confirm arrival of the initial message of a stream at a destination data processing unit of the stream. Once the source data processing unit receives this confirmation one can be sure that all subsequent messages of the stream will be forwarded. Therefore the decision to forward the messages can be simplified, by granting unconditional access if a message has a seniority beyond a threshold seniority of the last message before reception of the confirmation.

Preferably, partial forwarding of the initial message of a stream by node circuits in the network is confirmed to the source data processing unit even before the initial message reaches the destination data processing unit. This reduces the threshold seniority after which no arbitration is needed. Preferably, node circuits send confirmations so frequently that the threshold seniority can be reduced to one, so that contention for resources has to be arbited only for the initial message of the stream. This simplifies arbitration and minimizes useless resource occupation.

Preferably the node circuits discard messages of a stream if they do not timely receive confirmation of forwarding of the initial message. It is not necessary to make forwarding conditional on the reception of confirmations in each node circuit. It suffices to do so each time for multiple node circuits along a stretch of the path. For this purpose, it suffices that a single confirmation arrives at a node circuit at the start of a stretch at the latest in the same time-slot as a next message from a particular stream, to indicate that a previous message has successfully been forwarded to the end of the stretch. Hence, confirmations need only pass through a node circuit once per network period and no confirmations are needed at the node circuits along the stretch.

Preferably, node circuits send back one or more confirmations to indicate that a message has been successfully forwarded through the network, back along the path of the messages of the stream. As an alternative, the confirmations may be sent back outside the network for example. In the embodiment wherein the confirmations are sent back along the path through the network, the node circuits preferably send back the confirmations in return time slots that are selected so that crossing time slots, wherein the confirmation crosses subsequent messages of the stream, can be predicted by a predetermined scheme (e.g. so that crossing occurs in predetermined time slots, or in time slots that can be computed from information that is known to be included in the subsequent messages of the stream). The node circuits use the predetermined scheme to predict crossing time slots, and test whether they have received crossing messages and confirmations for the same stream in the predicted crossing time slot. If an expected crossing of a message and a confirmation is not detected, the node circuit discards that message. Thus, once an initial message has not been forwarded (as is evident from the absence of the expected confirmation) messages that are so senior that they should cross with the confirmation are also discarded, making it unnecessary to arbitrate for access to network resources for these messages. This simplifies arbitration and minimizes useless network occupation.

Preferably, the confirmations are sent sufficiently frequently that the first crossing at a node circuit must occur at most one network period (and preferably exactly one network period) after that node circuit has forwarded the initial message of the stream. Thus, it is ensured that the second and further messages of the stream can be forwarded without further arbitration if they cross with the confirmations. A delay of at most one network period between forwarding at a node and subsequent crossing at that node can be ensured by sending successive confirmations of forwarding of the initial message in time-slots at most half a network period from each other. In this way the sum, of the time for the initial message to travel from a node circuit from which a first confirmation is sent to a further node circuit from which a second confirmation is sent and for the conformation to travel back from the further node circuit to the node circuit, is at most a network period.

Preferably, the confirmations are sent in return time slots selected so that successive confirmations occupy network each resource periodically with said network period. In this way, the seniority arbitration scheme can also be used for the confirmations. Periodic occupation of network resources can be realized by sending confirmations of forwarding of an initial message when the initial message is forwarded in each of a series of time-slots that repeats with exactly half the network period. Thus, the return time slots of sending back confirmations can be selected simply by counting clock periods.

Preferably, a return stream is established from the destination data processing unit of an original stream in response to reception of the initial message of the original stream. The destination data processing is arranged to send return messages of the return stream so that they follow the confirmations of the original stream after an integer number of network periods, starting from one network period after the last confirmation. In this way, the preceding confirmations can be used as more senior messages of the return stream, which reduces (or even eliminates) the possibility that the return messages of the return stream will be discarded upon arbitration. Basically, the return stream is guaranteed access without need to arbitrate forwarding of return messages.

In an embodiment the receiving data processing unit is pre-arranged to send the messages of the return stream periodically starting form a time-slot that is selected dependent on the time-slot of arrival of the initial message of the original stream. The selection is made so that a sum of the time-slot sequence numbers $t_a$, $t_r$ of arrival of the initial message of the original stream and transmission of the message of the return stream equals a predetermined number "s" modulo the network period of the streams. This ensures in advance that, without even knowing the length of the path through the network, it can be determined in which time-slots messages of the return stream and the original stream will cross each other at a node circuit. The double of the sequence number of such crossing time-slots equals 2*(s+1), twice the predetermined number plus one modulo the network period of the streams. This enables the node circuits to select the time of transmission of the confirmations back along the path before transmission of the return stream.

The predetermined number may be selected the same for each stream, or it may be selected individually for each stream, the initial message of the stream indicating the number so that the node circuits can determine when to send confirmation messages. In an embodiment the predetermined number equals minus one modulo the network period. In this way the node circuits can send confirmations in time slots whose sequence number equals zero modulo half the network period.

These and other objects and advantageous aspects of the invention will be described by means of examples shown in the following figures.

FIG. 1 shows a data processing circuit, comprising a plurality of data processing units 10 and a network 12 interconnecting the data processing units. Typically, data processing units 10 and network 12 are integrated together in an integrated circuit. The term "data processing unit" is used generically for any type of circuit that produces and/or processes data, including, but not limited to, programmable signal processing cores, dedicated signal processing circuits, such as DCT (Discrete Cosine Transform) computation circuits, memory, IO circuitry etc. Although three data processing units 10 have been shown explicitly, it should be understood that, in practice, many more will be present.

Figure 1:
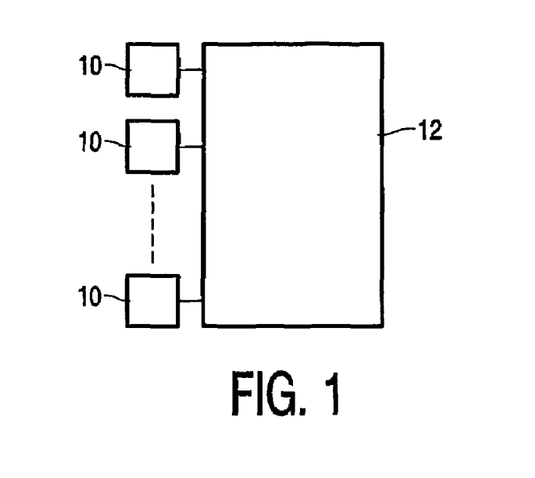
FIG. 1 shows a data processing circuit
Figure 2:
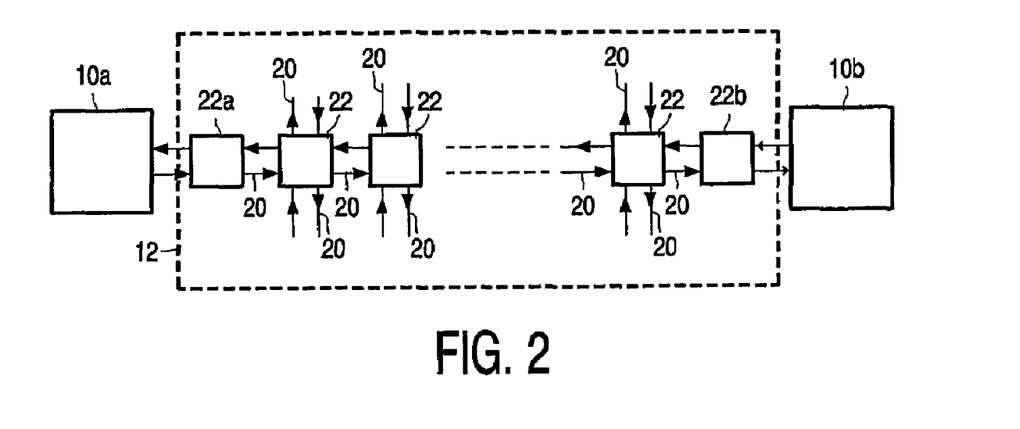
FIG. 2 shows a path through a network, connecting a pair of data processing units

FIG. 2 shows a part of network 12, containing communication conductors 20, node circuits 22 that interconnect communication conductors 20. Terminal node circuits 22a,b couple the data processing units 10a,b to the network 12. Although pairs of lines are shown for forward and backward communication over communication conductors 20, it should be understood that each line may in fact represent a plurality of communication conductors for message data and various control data for example. As shown part of the communication conductors 20 and node circuits 22 form a communication path through the network between a transmitting data processing unit 10a and a receiving data processing unit 10b. It should be emphasized that the figure merely shows a part of the communication conductors 20 and node circuits 22 in network 12 that is involved with the particular path that is shown. In practice many more communication conductors 20 and node circuits 22 may be present and many more paths may be possible, also between the pair of data processing circuits 10a,b that is shown in the figure.

Figure 2A:
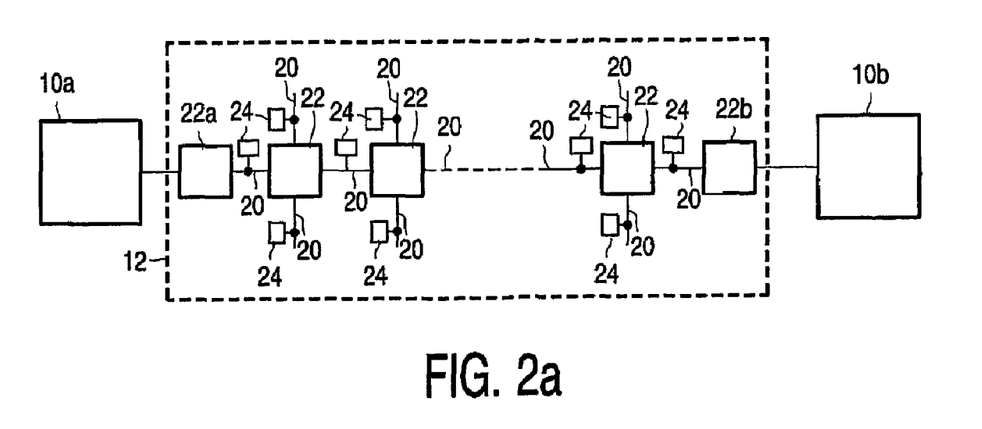
FIG. 2*a* shows a path through an alternative embodiment of a network

FIG. 2a shows a path through an alternative embodiment of the network, wherein communication conductors 20 are shared for forward and backward communication. Each time two node circuits 22 are connected to a communication conductor 20, as well as an access control circuit 24 which decides which of the node circuits will get access if both node circuits try to get access. It should be understood that in other types of network more than two node circuits 22 may connected to the same communication conductor 20.

In operation selected data processing units 10 transmit streams of data to selected other data processing unit 10 via network 12. Each stream comprises a series of messages that entered network 12 from a transmitting data processing unit 10a and are forwarded from node circuit 22 to node circuit 22 through network 12 to a receiving data processing unit 10b. Thus, each message of the stream passes along a path of nodes circuits 22 through network 12. Typically, the circuit works in successive time-slots, so that each message is transmitted along successive communication conductors 20 in successive time slots.

Data processing units 10 transmit messages from each stream periodically with a network period P, which typically be expressed in terms of a number of transmission time-slots from transmission of one message to transmission of the next message in a stream. All messages from the same stream always pass via the same path. For this purpose, in an embodiment, the transmitting data processing unit 10a includes a path description in each message, but the path may also be implied for example by the source and destination of the path. In addition the transmitting data processing unit 10a, or terminal node circuits 22a,b include information in the message to indicate whether the message is an initial message of a stream or not.

Figure 3:
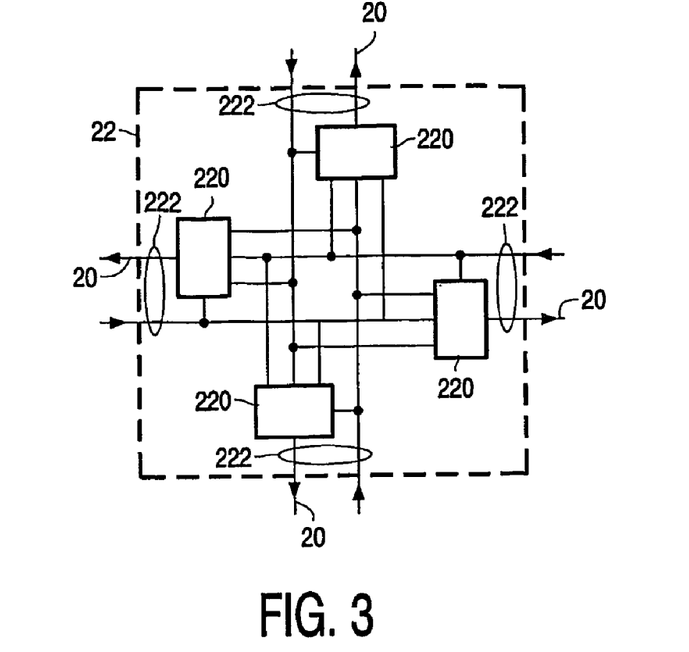
FIG. 3 shows a node circuit

FIG. 3 shows an embodiment of a node circuit 22. This embodiment contains a number of ports 222 coupled to the communication conductors 20 that are coupled to node circuit 22 and respective routing circuits 220 for the respective ports 222. Each routing circuit 220 has an output coupled to a respective outgoing communication conductor 20 from its port and inputs coupled to incoming communication conductors from the remaining ports 20. In the embodiment wherein communication conductors serve for two-way or more way communication the outputs of the routing circuits are coupled to a combined input/output of the port 222. The node circuits are shown with four inputs and four outputs only for the sake of the example. It should be understood that the node circuit may have any number of ports and routing circuits.

Figure 3A:
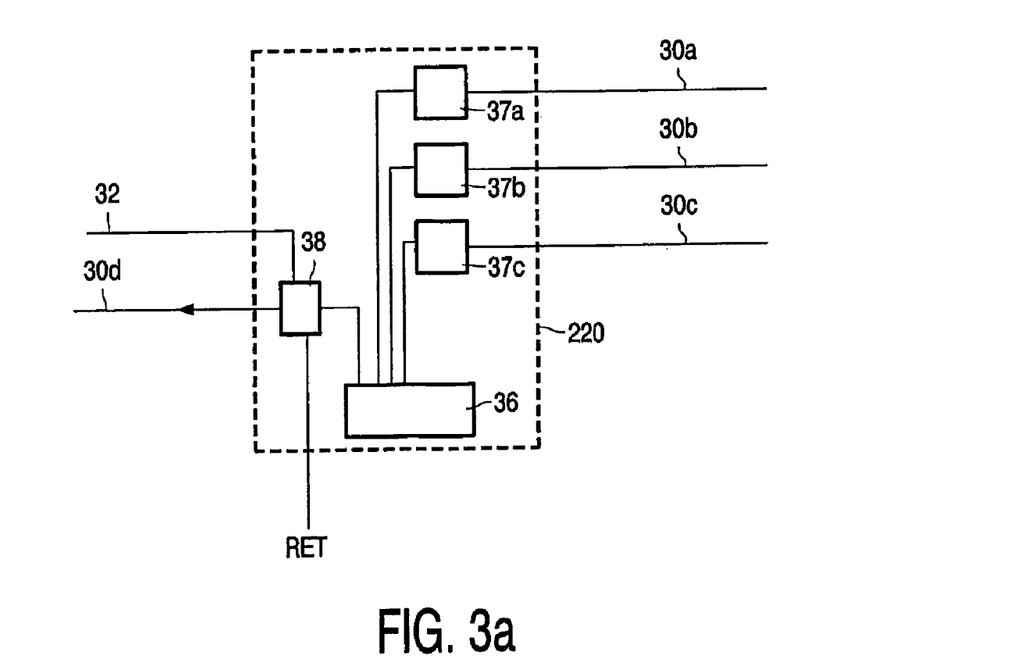
FIG. 3*a* shows part of a node circuit

FIG. 3a shows an embodiment of a part of a routing circuit 220.

Routing circuit 220 contains an input message memory 36, reception circuits 37a-c and a forwarding circuit 38. Input message memory 36 is coupled to outgoing data conductor(s) 30d via forwarding circuit 38 and has ports coupled to reception circuits 37a-c. Forwarding circuit 38 is also coupled to an incoming data conductor(s) 32 from the same port as its outgoing data conductor 30d. Each of the reception circuits 37a-c is coupled the incoming data conductors of a respective one of the remaining ports. Furthermore forwarding circuit 38 has an input for a return enable signal.

In operation node circuit 22 receives messages from incoming data conductors 30a-c and stores these messages in input message memory 36. Forwarding circuit 38 inspects each message to determine whether the message should be forwarded via the outgoing data conductor(s) 30d that is (are) coupled to the forwarding circuit 38. Forwarding circuit 38 bases the decision to forward a message first of all on whether messages from more than one input 30a-c are present and in selected timeslots also on whether a return message has been received from input 32.

In the embodiment wherein two-way or more way communication conductors are used forwarding circuit 38 also makes the decision to forward dependent on whether it can get access to outgoing communication conductor 30d. In this embodiment forwarding circuit issues an access control signal according to the position of the outgoing message in its stream (initial or subsequent). If the message is a subsequent message forwarding circuit 38 applies an overruling access signal to the access control circuit and is ensured to be able to transmit the message over its data conductor(s) 30d. If the message is an initial message, forwarding circuit 38 applies a requesting signal to the access control circuit. If the access control circuit 24 that is provided for the communication conductor returns an access grant signal, forwarding circuit 38 transmits the message over its data conductor(s) 30d. If not, the message is not transmitted. In this case the message is lost and said to be discarded.

In this embodiment the access control circuit 24 that is provided for a communication conductor returns an access grant signal only if it does not receive an overruling signal from any forwarding circuit (in any attached node circuit). If access control circuit 24 receives a single request and no overruling signal it grants the request. If access control circuit 24 receives non-overruling requests from more than one forwarding circuit, it selects one of these forwarding circuits and grants access to that forwarding circuit.

Although for the sake of clarity separate routing circuits 220 for each port are shown in FIG. 3, with memories 36 that store incoming messages from other ports, it will be understood that in practice of course a single routing circuit may be used for all ports, one memory storing received messages from all ports, the routing circuit routing messages to any appropriate port.

As will be discussed in the following the source data processing unit 10 that transmits the messages of the stream is informed about the success of transmission of at least the initial message through network 12. The source data processing unit 10 is arranged to refrain from transmitting subsequent messages from the stream if the initial message is discarded anywhere. In this case the source data processing unit 10 will typically try to start the stream anew at a different time point.

It should be appreciated that by means of this mechanism, a guaranteed channel is made available, taking up periodically repeating time-slots in node circuits along the path, for the messages of the stream once an initial message of a stream has been successfully forwarded. When an initial message has been forwarded by a node circuit in a time slot it is known that no older streams block access by requiring that node circuit in that time slot. Once transmission of the initial message has succeeded it is ensured that later arising streams cannot prevent access at the expense of subsequent messages.

In the following a description will be made of ways of informing a data processing unit 10 about success of transmission of the initial message.

In a first embodiment the receiving data processing unit 10b of a stream (further called "the original stream") is arranged to set up a return stream in response to reception of the initial message of the original stream. Messages from the return stream are transmitted along the same path along the same node circuits 22 as the messages of the original stream, but in opposite direction. Like the original stream (and any other stream), the return stream consists of messages that are transmitted in periodically repeating time-slots.

Thus, transmitting data processing unit 10a is informed about successful transmission of the initial message of the stream by the arrival of the initial message of the return stream. If transmitting data processing unit 10a does not receive the initial message of the return stream in time, it infers that the initial message has been discarded and ceases transmitting subsequent messages of the original stream.

Preferably, node circuits 22, upon receiving the initial message of the original stream, transmit precursor messages of the return stream back along the path in those periodic time slots wherein subsequently message of the return stream will be transmitted. This enables transmitting data processing unit 10a to detect sooner that the initial message has been discarded, so that it can cease transmitting subsequent messages of the original stream sooner. Of course, for this purpose the node circuits 22 need to know when the messages of the return stream will arrive in future. Preferably the circuit is arranged so that this follows from the time of arrival of the initial message of the original stream.

In an embodiment, this is facilitated because the receiving data processing unit 10b is arranged to select the time slot of transmission of the initial message of the return stream dependent on the time slot of reception of the initial message of the original stream. The selected time slot is determined by the following considerations. Let successive integer numbers "t" be assigned to the time-slots. Let "$t_a$" the number of the time slot in which the initial message of the original stream arrives at the receiving data processing unit 10b. Since the messages from the original stream are transmitted periodically, messages will arrive in any subsequent time slot for which $$t = t_a \bmod P$$

(Herein the conventional modulo qualification "mod P" behind an equation (or statement of equality) indicates that the equation (or equality) is satisfied if some integer multiple of P is added to the right hand side. More particularly, in the current equation that there exists an integer number "n" so that $t = t_a + n\,P$). Let "$t_r$" be the number of the time slot of transmission of the initial message of the return stream from the receiving data processing unit 10b. Now the receiving data processing unit 10b is arranged to transmit the initial message of the return stream in the first time-slot, which satisfies $$t_r = -t_a - 1 \bmod P$$

This selection is made to ensure that messages from the return stream and the original stream cross each other along the path at specific time points. A crossing is said to occur at a time slot with number $t_c$ if a message from the original stream passes on specific data conductor(s) 20 between a pair of node circuits 22 in a time slot with the number $t_c - 1$ and a message from the return stream passes between that pair of node circuits 22 in the opposite direction in the time slot with number $t_c$. With the preceding choice of $t_r$, the time points $t_c$ satisfy $$2t_c = 0 \bmod P$$

That is, $t_c$ repeats with a period of P/2 if P is even. The surprising result is that time-slot of crossing does not depend on the pair of node circuits 22 that is involved, or on the time slot of transmission of the message from the source data processing unit 10. That this is so can be seen as follows. If one numbers the data conductor(s) 20 with integer numbers "i", increasing along the path, starting from zero at the source data processing unit 10 and increasing to "k" at the receiving data processing unit 10b, then messages of the original stream pass on a data conductor(s) 20 with number "i" in time-slots with number $t_i$ that satisfy $$t_i = t_0 + i \bmod P$$

Accordingly, the time-slot of arrival of these messages at the receiving data processing unit 10b satisfies $$t_a = t_0 + k \bmod P$$

Messages of the return stream pass on a data conductor(s) 30a with number "i" in time-slots with number $t_i'$ that satisfy $$t_i' = t_r + k - i \bmod P$$

Substituting the expressions for $t_r$ and $t_a$:

$$t_i' = -t_0 - 1 - i \bmod P$$

Crossing occurs when $t_i' = t_i + 1$, i.e. when $$t_0 - i - 1 = t_0 + i + 1 \bmod P$$

That is if $$2*i = -2*(t_0 + 1) \bmod P$$

So that $$2*t_i' = 0 \bmod P$$

This is the relation mentioned earlier, which says that the time-slot of crossing does not depend on the data conductor(s) 20 involved, nor on the time slot of transmission of the message from the source data processing unit 10a. This is applied in the node circuits 22 by generating precursor messages of the return stream and transmitting them back along the incoming data conductor(s) 30d in a time slot "t" if (a) t satisfies $2t = 0 \bmod P$ (this is indicated by a clock signal with a period of half the network period P at the RET input).

(b) a message from an original stream has arrived at the node circuit from the incoming data conductor(s) 32 and access is available to forward that message (c) no message or precursor message of the return stream for the original stream has arrived back along the path in the preceding time slot t−1((as can be determined by inspecting memory 36 for such messages)

(d) access is available for transmitting a precursor message back along the incoming data conductor(s) 30*d* in the time slot t When the precursor message is generated the forwarding circuit 38 flags it as an initial message. However, when a node circuit receives an initial message (precursor or any other message from a stream that is marked as a return stream at a time t−1 that satisfies 2*t*=0 mod P, the node circuit forwards this message after converting the message to a "subsequent" message, so that it is no longer an initial message for the purpose of forwarding decisions. Thus, the precursor message is able to proceed along the path paved by earlier precursor messages, getting overruling access.

Figure 4:
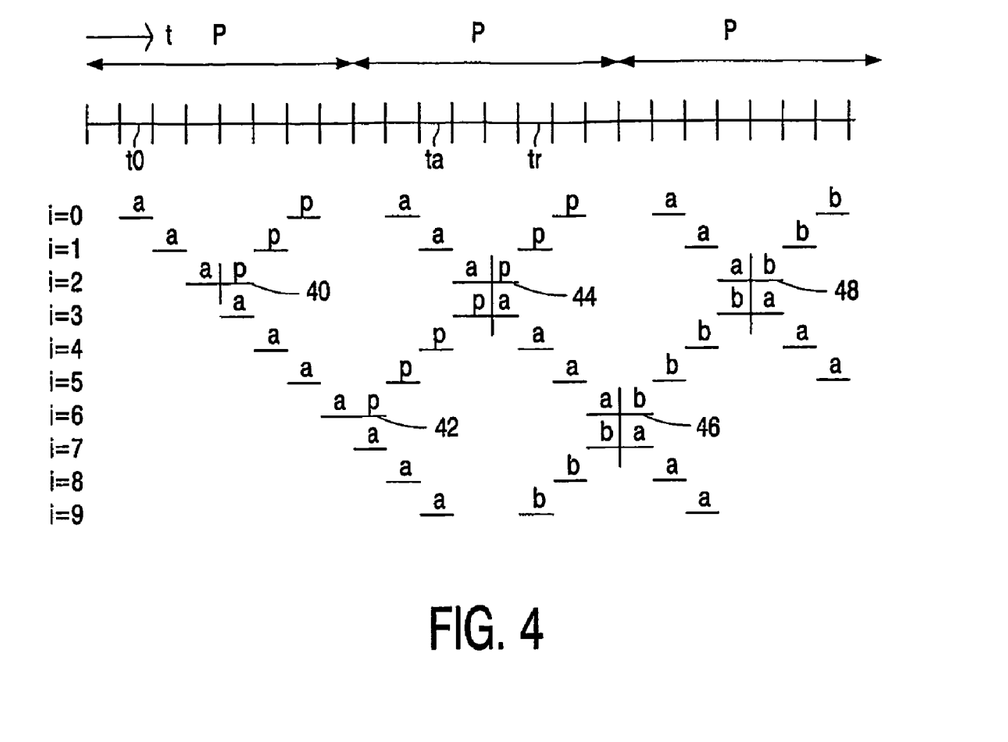
FIG. 4 illustrates time-slots used during communication

FIG. 4 illustrates occupation of the data conductors along a path as a function of time when this mechanism is used. A first horizontal line is used to indicate successive time slots, which are grouped into network periods of P=8 time slots. Successive rows below this line are used to signal occupation of successive data conductor(s) along the path through the network, labelled with the index "i". A transmitting data processing unit 10*a* transmits an initial message (marked "a") of an original stream in a first time slot $t_0$. This initial message travels along successive data conductor(s) along the path in successive time slots. The initial message arrives at the receiving data processing unit 10*b* in a second time slot $t_a$. In response, receiving data processing unit 10*b* starts transmitting messages (marked b) of the return stream in a time slot $t_r$, whose slot number is related to $t_a$ according to $$t_r = -t_a - 1 \bmod P$$

As may be noted the messages b from the return stream cross the messages a from the original stream (cross, i.e. occupy a data conductor in the time slot after the time slot wherein that data conductor was occupied by a message from the original stream) at crossings 46, 48 at the start of the network periods and halfway the network periods. As has been explained, with the appropriate selection of the time slot $t_r$ for messages of the return stream this property does not depend on the length of the path through the network or the starting time-slot $t_a$ of the original stream.

The node circuits 22 generate precursor messages (marked p) of the return stream, when a message from the original stream has arrived in such a time slot and no message of the return stream is received. Thus, crossings 40, 42 are simulated. The precursor messages in turn may cause a crossing 44. At such a crossing no new precursor message needs to be generated. The old precursor message p is simply forwarded.

It should be appreciated that the precursor messages p indicate to the transmitting data processing unit 10*a* of the original stream that the initial message of the original stream has not been discarded along successively further parts of the path through the network. When the transmitting data processing unit does not receive a precursor message or normal message of the return stream it does not transmit the next message of the original stream.

At the same time, the precursor messages serve to pave the path for the return stream. Along most of the path the real initial message of the return stream (the first message sent by receiving data processing unit 10*b*) is in fact a "subsequent" message that follows one or more precursor messages (that have been sent by node circuits 44). The real initial message follows the last preceding precursor message at each node circuit 22 after exactly one network period P. Therefore the real initial message can be treated as a non-initial message that gets unconditional access without the risk of having to cede to other streams.

Although the invention has been described by means of a specific embodiment, it should be appreciated that various different embodiments are possible. For example, in one embodiment the node circuits do not send precursor messages, or at least do not send precursor messages corresponding to all time slots that satisfy 2t=0 mod P. This has the effect that confirmation that the initial message of the original stream has traveled successfully along part of the path arrives later. Accordingly, the transmitting data processing unit may have to transmit a subsequent message of the original stream before reception of the first possible precursor message. This in turn has the effect that this subsequent message may attempt to get transmitted along a data conductor where the initial message was discarded because of a collision with another stream.

In this case the subsequent message should likewise be discarded. Therefore it is not possible in this case to grant access unconditionally to subsequent messages. For this purpose the subsequent message preferably contains information representing its sequence number in the original stream. In this embodiment, in case of contention for a data conductor, access control circuit 24 grants access to the most senior contending message (having the highest sequence number) and in case of equal seniority a scheme is used that grants consistent access to the same stream. In this scheme use of the sequence number generalizes the distinction between initial and subsequent messages. The sequence number need not represent sequence numbers higher than the maximum number of messages that can be transmitted with a network period P before the transmitting data processing unit will receive confirmation of arrival of the initial message. The maximum sequence number may be used in all messages with higher sequence number.

In another embodiment other time-slots for transmitting messages of the return stream may be used. For example if data processing unit 10 selects the numbers $t_r$ of the time slots in which it sends the messages of the return stream to satisfy $$t_r = -t_a - s \bmod P$$

(wherein s is an odd offset value) then the number of the time-slot of crossing satisfies $$2t_c = 2*(1-s) \bmod P$$

That is, crossings still occur with a period of half the network period P, but at a different phase in the network period P. Accordingly, in this case the node circuits send precursor tokens in the time slots that satisfy the expression for $t_c$. The offset value "s" may be chosen to be equal for all streams, or it may be selected independently for each stream. In the latter case, the offset value may be specified in the messages (or at least the leading messages of each stream), and the node circuits may be arranged to select time slots of sending the precursor tokens according to the expression for $t_c$ as a function of the specified offset. The specification of the offset value may be explicit or inherent, e.g. as a result of a type indication of the stream, or dependent on the source or destination of the stream. If the length "k" of the path is known in advance (and can be derived from the messages), the offset value "s" can even be specified by specifying a time slot numbers $t_r$ of sending return messages.

However, it will be appreciated that the embodiment that has been described has the advantage that the time of crossing can be determined without any advance knowledge about the length of the time path. As a result, the path can be selected dynamically.

It must be appreciated that in other embodiments no return stream needs to be involved. In this case, what have been called precursor messages in the preceding merely serve as confirmation messages of forwarding. Other mechanisms also exist for signalling to the source data processing unit 10 whether the initial message of a stream has been successfully forwarded. For example, another communication may be used, separate from the network, without requiring a return stream. If a return stream is used, a separate additional network may be used for sending all return streams. In this case the node circuits may send precursor messages via this additional network.

It will be understood that the mechanism that has been described assumes that all messages of a stream will be sent via the same path. Thus, the fact that an initial message has managed to travel along the path starting in a specific time-slot can be used to seize access to the data conductors along that path for subsequent messages, without fear of collision with older streams. Many ways can be used to ensure use of the same path. For example, the messages may specify the path, so that the nodes will route the messages dependent on the specified path. As another example, the node circuits may be arranged to route the messages along a reproducible path, for example by retaining information about the selected route for a previous message from the same stream, or by using a predetermined route from a given source to a given destination.

When the messages specify the path, the path specification may be selected in advance by the transmitting data processing unit 10a, or it may be derived from a path selected by the node circuits for the initial message of the stream. In the latter case information about the path may be added to the initial message as it travels along the path, and the node circuit may report back this information in the precursor messages, so that the transmitting data processing unit 10a can include a specification in subsequent messages.

Optionally, at the time of crossing the node circuits may cross-transfer path information between the crossing messages of the original stream and the return stream. Thus, for example; at the time of crossing the messages may each time receive information about the path to be followed to the next crossing. The node circuit may transfer information that specifies the path followed by a message from the original stream from the message of the return stream. In this way information about the path to the time of next crossing (or further) may be provided to the message from the original stream. As a result, the path can be dynamically selected at the time of forwarding of the initial message and no path information needs to be kept in the nodes. Vice versa similar information may be transferred from the message of the original stream to the message of the return stream. This saves on the amount of data needed to represent the path, but is not strictly necessary, since messages of the return stream can be provided with information about the backward path ab initio.

Although the invention has been described using an embodiment wherein the node circuits forward each message immediately in the time slot following the time slot of arrival, it should be understood that, without deviating from the invention, the node circuits may be arranged to buffer the messages for a number of time-slots, for example to wait for the availability of a data conductor. In this case, once the initial message of the stream has been buffered in a node circuit, subsequent messages of that stream should be buffered for the same number of time slots at that node circuit. This may be specified in the same way in which the path is specified.

This embodiment may be combined with a return stream and generation of precursor messages in the node circuits. In an embodiment the node circuits as before generate (but not necessarily transmit) the precursor messages in time slots that satisfy $$2t_c=0 \mod P \text{ or more generally } 2t_c=2*(1-s)\mod P$$

However condition (b) for sending a precursor message is generalized to (b') a message from the original stream has arrived at the node circuit form the incoming data conductor(s) 32 in the preceding time slot t−1, or this message has arrived in an earlier time-slot and is still buffered awaiting transmission. Condition (d) for sending a precursor message is relaxed, because the precursor message may remain buffered for a number of time slots before transmission. Instead, the precursor message is preferably discarded if transmission is delayed so much that the precursor message does not, or cannot, arrive in before the time-slot for the next crossing time slot at the node circuit where that crossing has to take place (as determined by the transmission of an earlier precursor from that node circuit).

Figure 5:
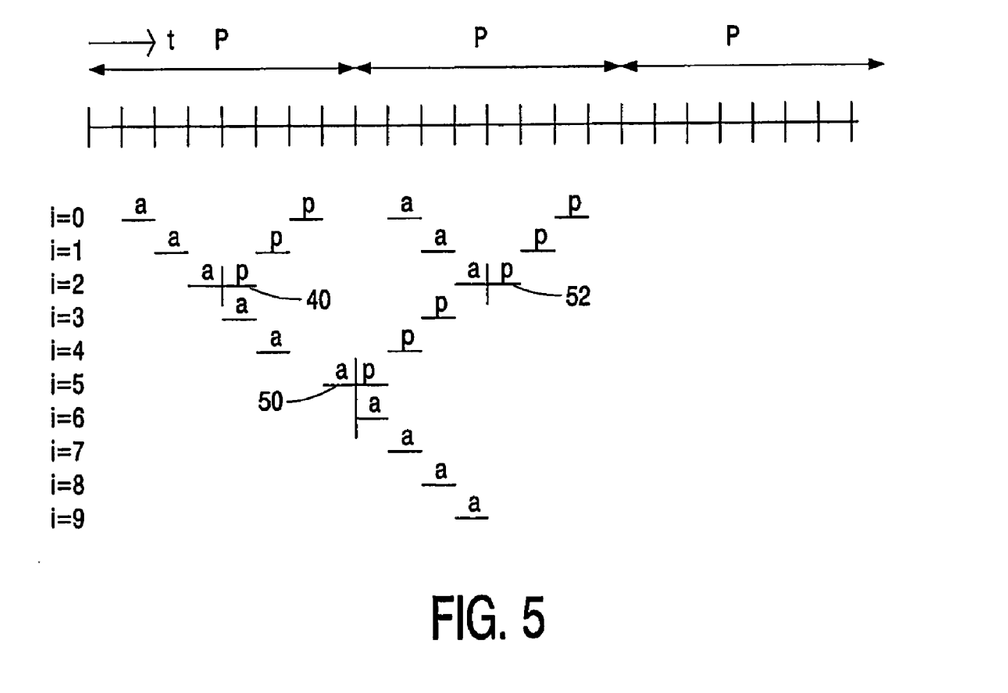
FIG. 5 illustrates further time-slots used during communication

FIG. 5 illustrates an example of occupation of the data conductors along a path as a function of time when this mechanism is used. As shown with reference 50 the initial message of the original stream is buffered in a time slot. The new precursor message corresponding to this initial message is transmitted in the normal time-slot as described before, but from another node circuit than in the absence of delay. Subsequently, the new precursor message crosses a message from the original stream in a time slot 52 at a node circuit a whole network period P after a time slot 40 in which an older precursor was transmitted from that node circuit. To realize transmission in this time slot from that node circuit the precursor must be delayed, but this delay may occur anywhere along the path.

As one may note, this limits the delay that the precursor message may undergo before arriving at the node circuit of crossing in time slot 52, to the delay undergone by the initial message of the original stream. If the precursor message suffers greater delay it has to be discarded. This condition may be relaxed by introducing an intentional delay each time before transmitting a precursor message after the time-slot for which it is generated. Thus, the time constraint on the arrival of precursor messages from node circuit further down the path is relaxed. In an embodiment, the intentional delay may be set dependent on the delay suffered by the initial message of the original stream, increasing the intentional delay of the precursor message if the initial message has suffered little delay, and decreasing the delay of the precursor message if the initial message has suffered more delay. The reason for this is as follows: it will be remembered that the precursor message has to arrive back, at node circuits upstream along the path, one network period after transmission of a preceding precursor message. More time is left to realize this when the initial message has traveled with little delay to the node circuit 22 from which the precursor message is sent. When it is found that this additional time is available it may be used to relax the timing constraints on node circuits 44 downstream, by delaying transmission of the precursor message from the node circuit 22.

Although only streams of messages in periodically repeated time slots have been described, it should be understood that in embodiments individual messages that are not part of a stream may be transmitted through the network in addition. If such an individual message collides with a message from an existing stream, the message from the existing stream gets preferred access. Thus, it is possible to send additional messages as well, without disrupting the stream.

Although the invention has been described using the same time-slots for all node circuits, which typically requires a central clock, it will be understood that it is not necessary to use centrally synchronized time-slots. Communicating node circuits may synchronize locally, possibly using some kind of asynchronous handshaking.

Furthermore, although the invention has been described for streams that occupy each resource for a single time-slot in each network period, it should be appreciated that more complicated streams may be used that occupy the resource in a pattern of more than one time slot in each network period. Effectively, this comes down to establishing a plurality of streams that each occupy each resource for a respective single time slot in each series, and discontinuing all of these streams if an expected confirmation is not received for any one of the streams.

Furthermore, although the invention has been described for the case that a single message can pass along a communication connection in a single time slot, it will be understood that in other embodiments, each communication conductor 20 may support transmission of a plurality of messages per time slot. In an alternative embodiment this may be used to transmit messages from multiple streams of periodic messages in the same time slot and/or individual messages that do not belong to a periodic stream. The number of messages that may be transmitted in a time slot along a communication conductor 20 may be a predetermined number of messages, or the number of messages may depend on the combined sizes of the messages. In the latter case the messages of a given stream preferably all have the same size, or should at least claim the same (maximum) size. The node circuits preferably use the claimed size of a given stream to limit the number of other streams of periodic messages for transmission in the time slot along the same communication conductor. This number of other streams is limited so that their combined claimed size leaves sufficient capacity the time slot for the maximum size of the messages from the given stream. If a message requires from the given stream less than the claimed size (or even no size at all), the node circuit may use the remaining bandwidth may be used for transmission of individual messages.

Similarly, each message may extend over a plurality of time slots. In this case transmission basically comes down to transmission of multiple streams in successive time slots.

Furthermore, although the invention has been described for handling bandwidth limitations on communication conductors 20, it will be appreciated that the invention may be applied to handle other types of resource limitations in the network as well.

Furthermore, it will appreciated that, although the invention has been illustrated by means of a particular circuit, other circuit implementations are possible. For example, instead of a structured node circuit 22 as shown in FIGS. 3 and 3a a simplified node circuit may be used with a processing circuit that processes inputs messages from all communication conductors 20 and transmits messages at selected communication conductors 20. As another example, although data processing units 10 have been shown that are connected to a communication conductor 20 via terminal node circuits 22a, b, one may of course include the function of the terminal node circuits 22a, b in the data processing units 10a, b (in which the data processing unit is considered to be a node circuit as well), or in multi-input node circuits. By using terminal node circuits 22a, b the data processing circuits 10 have access to the terminal node circuits without contention, the terminal node circuits 22a, b handling access to the communication conductors 20.

The invention claimed is:

1. A data processing circuit contained on an integrated circuit, comprising:
   a network (12) contained on the integrated circuit, that is operable in successive time-slots;
   a plurality of data processing units (10) contained on the integrated circuit, interconnected by the network (12), and arranged to send streams of messages concurrently through the network (12), each stream comprising messages that occupy shareable resources (20) in the network (12) in a periodically repeating selection of successive time-slots, a period of repetition (P) being the same for all the streams;
   node circuits (22) in the network (12), the node circuits (22) being arranged to forward the messages along multi-node paths through the network (12), each particular stream being assigned a respective stream specific path along which the node circuits (22) forward all messages of the particular stream, the node circuits (22) being arranged to decide whether to forward or discard each message dependent on a measure of seniority of the message in its particular stream, each particular node circuit (22) being arranged to prevent forwarding of a more junior message in the particular stream for which insufficient resources (20) are left because of forwarding of a more senior message from another stream from the particular node circuit (22)
   wherein at least one of the node circuits is arranged to send back a confirmation of successful forwarding of a message from an initial part of a particular stream up to said at least one of the node circuits, at least a further one of the node circuits (22) being arranged to forward a subsequent message from the particular stream only after timely reception of the confirmation.

2. A data processing circuit according to claim 1, wherein at least one of the node circuits (22) is arranged to generate a confirmation of successful forwarding of a message from an initial part of a particular stream and to send the conformation back through the network (12), and wherein
   a further node circuit back along the path from the at least one of the node circuits (22) is arranged to detect, upon receiving a further message from the stream, whether the further message and the confirmation cross in the further node circuit (22) in a crossing time-slot, and to forward the further message only upon detection of said crossing, the further circuit selecting the crossing time-slot according to a predetermined scheme,
   the at least one of the node circuits (22) being arranged to send back the confirmation in a selected return time-slot, the return time-slot being selected in predetermined way so that the confirmation, if not lost, will cross the further message in the crossing time slot determined according to the predetermined scheme.

3. A data processing circuit according to claim 2, wherein the node circuits (22) are arranged to send back confirmations of successful forwarding in a plurality of selected return time slots which are separated by at most half said period (P).

4. A data processing circuit according to claim 3, wherein the node circuits (22) are arranged to decide whether to forward or discard each particular message on the basis of seniority dependent only on whether the particular message is an initial message of its particular stream or not.

5. A data processing circuit according to claim 2, wherein the node circuits (22) are arranged to send back one or more confirmations when successfully forwarding messages in a plurality of selected return time slots which are selected so that the confirmations reach the source data processing unit (10a) in arrival time-slots that repeat with said period (P).

6. A data processing circuit according to claim 5, wherein a destination data processing unit (10b) at an end of the path is arranged to start transmitting a return stream of return messages in selected return time slots, selected so that the return messages reach the source data processing unit (10a) in arrival time-slots that repeat with said period (P), following the confirmations starting from one period after a last confirmation, the one or more confirmations forming one or more precursor messages of the return stream, the node circuits (22) treating the return messages with higher seniority than at least an initial one of the one or more precursor messages.

7. A data processing circuit according to claim 2, wherein the node circuits (22) are arranged to send back confirmations when successfully forwarding a message from the particular stream in predetermined time slots, which repeat with half said period (P).

8. A data processing circuit according to claim 7, wherein a destination data processing unit (10b) at an end of the path is arranged to start transmitting a return stream of return messages in selected return time slots, selected dependent on the time slots of arrival of messages from an original stream at the destination data processing unit, the return time slots of transmitting the messages of the return stream being selected so that a sum $(t_a+t_r)$ of time-slot sequence numbers $t_r$ of the time slots of transmission of the return stream and time-slot sequence numbers $t_a$ of arrival of the messages of the original stream equal a predetermined number "s" modulo a length of the period, the confirmations being transmitted in time slots so that twice the sequence number of these slots equals $2*(s+1)$, twice the predetermined number plus one modulo the length of the period.

9. A data processing circuit according to claim 2, wherein the source data processing unit (10a) is arranged to discontinue transmission of messages from the stream if the confirmation is not received by the source data processing unit (10a) in a confirmation time slot that is determined by the predetermined return time-slot.

10. A method of processing data in a data processing circuit contained on an integrated circuit, that contains a plurality of data processing units (10) contained on the integrated circuit, interconnected by a network (12) of node circuits (22) contained on the integrated circuit, the node circuits (22) using successive time slots to forward messages along transmission paths between pairs of the data processing units (10), using resources (20) that the network (12) allows to be shared between different paths on a time slot multiplexing basis, the method comprising:

starting streams of messages, each from a respective source data processing unit (10a) to a respective destination data processing unit (10b), each stream comprising messages that occupy the resources in a periodically repeating selection of time-slots, the period of repetition being the same for all the streams;

forwarding all the messages of the particular stream through the network (12) along the node circuits (22) in a stream specific path assigned to the particular stream, the node circuits (22) deciding to forward or discard each message dependent on a measure of seniority of the message in its particular stream, each particular node circuit (22) preventing forwarding of a more junior message for which insufficient resources are left because of forwarding of a more senior message from the particular node circuit wherein at least one of the node circuits is arranged to send back a confirmation of successful forwarding of a message from an initial part of a particular stream up to said at least one of the node circuits, at least a further one of the node circuits (22) being arranged to forward a subsequent message from the particular stream only after timely reception of the confirmation.

11. A method according to claim 10, comprising:

generating a confirmation, in at least one of the node circuits (22), to confirm successful forwarding of a message from an initial part of a particular stream from the at least one of the node circuits (22) to the source data processing unit of the particular stream, transmitting the confirmation from the at least one of the node circuits (22) back along the path to the source data processing unit (10a) in a selected return time-slot, selecting the return time-slot so that, if not lost, the confirmation will cross a further message from the particular stream in a crossing time slot that can be predicted according to a predetermined scheme;

detecting whether the further message of the stream crosses with the confirmation in a further node circuit (22) in the crossing time-slot predicted according to the predetermined scheme;

forwarding the further message from the further node circuit (22) only if such a crossing is detected.

12. A method according to claim 11, comprising:

sending back one or more confirmations in selected return time slots from node circuits which are selected so that, in the case of more than one confirmation, the confirmations reach the source data processing unit (10a) in arrival time-slots that repeat with said period (P);

transmitting a return stream of return messages back along the path through the network (12) from a destination data processing unit (10b) to the source data processing unit (10a), in response to reception of an initial message of the particular stream destination data processing unit (10b), in time slots selected so that the return messages occupy the resources in a further periodically repeating selection of time-slots, with said period (P) of repetition, starting from one period (P) after a last one of the one or more confirmations.

* * * * *